United States Patent [19]
Gupta

[11] Patent Number: 6,069,928
[45] Date of Patent: May 30, 2000

[54] SCALABLE RECEIVER STRUCTURE FOR EFFICIENT BIT SEQUENCE DECODING

[75] Inventor: Sanjay Gupta, Raleigh, N.C.

[73] Assignee: Cirrus Logic, Inc., Fremont, Calif.

[21] Appl. No.: 08/885,803

[22] Filed: Jun. 30, 1997

[51] Int. Cl.$^7$ ...................................................... H04L 7/00
[52] U.S. Cl. ........................................... 375/366; 370/514
[58] Field of Search .................................... 375/365, 366, 375/261, 340, 377, 330, 368, 356; 370/503, 509, 510, 512, 513, 514, 511, 350; 371/47.1, 37.7

[56] References Cited

U.S. PATENT DOCUMENTS

| | | | |
|---|---|---|---|
| 5,371,737 | 12/1994 | Nelson et al. | 370/84 |
| 5,373,536 | 12/1994 | Dehner, Jr. et al. | 375/106 |
| 5,638,054 | 6/1997 | Davis et al. | 340/825.44 |
| 5,701,329 | 12/1997 | Croft et al. | 375/224 |
| 5,715,278 | 2/1998 | Croft et al. | 375/224 |
| 5,898,707 | 4/1999 | Takabayashi | 370/340 |

*Primary Examiner*—Chi H. Pham
*Assistant Examiner*—Emmanuel Bayard
*Attorney, Agent, or Firm*—J. P. Violette; Peter Rutkowski; David L. Stewart

[57] ABSTRACT

Synchronization words, contained within a data transmission are detected by oversampling the incoming data transmission by a factor of M. Each of M samples are stored in a respective register on an ongoing basis and a receiver is activated to monitor the contents of all registers to determine if they contain a synchronization word. Commonly a plurality of registers may detect the presence of a synchronization word simultaneously. The one having the largest amplitude bit samples is selected and the receiver changes mode to monitor the output of that register while another receiver is activated to monitor all registers. This is particularly useful in detecting synchronization words or flags in data packets, particularly in modem to modem communications.

21 Claims, 7 Drawing Sheets

SCALABLE RECEIVER STRUCTURE FOR EFFICIENT BIT SEQUENCE DECODING

BACKGROUND OF THE INVENTION

1. Field of the Invention

The invention relates to the field of data communications and, more particularly, to recognizing a synchronization word or flag during data transfers over a very noisy communications channel.

2. Description of Related Art

With the advent of high speed modem technology, such as employed in the V.34 modem design, modems now have the capability of adaptively selecting from a set of data transmission rates from 2400 to 33600 bits/second. This allows the modems to operate over a wide variety of communications channels, ranging from almost noise-free to very-noisy. However, before the high speed data rate can be established, the modems are typically required to exchange critical modem capability information using a robust low speed protocol. Examples of the use of such low speed protocols are the use of the 300 bits/second V.21 modem during V.8 bis handshaking, the use of 600 bits/second differential phase shift keying (DPSK) during Phase-2/V.34, and the use of low speed quadrature amplitude modulation (QAM) during Phase -4/V.34, to name a few.

For the transmission of the capabilities information, a V.34 modem typically transmits one or more frames of bit-error protected data. For example, The INFOO, INFO1C, and INFO1A sequences used during Phase-2/V.34 consist of "Fill Bits", a "Frame-sync" byte, several information bits, and finally, the cylic-redundancy-check (CRC) word. The receiving modem is required to synchronize it's receiver on the frame-sync byte and then ensure that the trailing capabilities data passes the CRC check. This may require the receiver to compensate for channel distortions and then establish bit timing so that the data can be correctly sampled. The general procedures for the transmission and detection of such a frame of CRC protected data is well known to those skilled in the pertinent art.

Consider the example of implementation of the 600 bits/second DPSK receiver structure used in phase-2 of the V.34 modem. One may approach this bit decoding problem by employing a correlation demodulator followed by a bit sampler. This type of a DPSK detection receiver is well known in the pertinent art. In this approach, the time required for the convergence of the bit sampler may be of the order of several bits, especially under very noisy conditions. Under the condition that the establishment of the bit sampling timing cannot be achieved, the received bits may be in error, requiring one or more retransmissions of the transmitted data frames. This causes undesirable delays in the modem startup sequence.

The problem of establishing the correct sample timing may be alleviated under certain conditions by buffering up the sample data until satisfactory convergence of the timing tracker has been achieved, then correctly sampling the buffered data to produce the correct transmitted frame. However, this may lead to increased buffering resources requirements and/or peaky processor loading, which may be undesirable from a systems standpoint.

SUMMARY OF THE INVENTION

In accordance with the invention, methods, apparatus, systems and computer program products are provided which enable detecting a synchronization word by sampling an incoming signal at M times an expected bit rate, storing N occurrences of a respective one of M samples in a respective storage unit and monitoring the contents of all storage units to determine whether they contain a bit pattern which corresponds to the synchronization word.

DESCRIPTION OF THE PREFERRED EMBODIMENT

Figure 1:
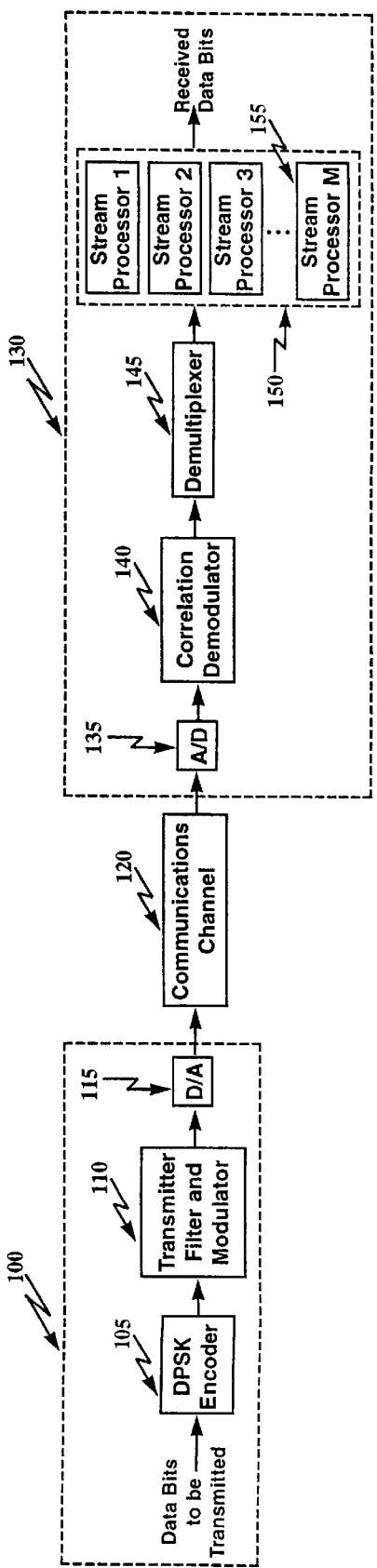
FIG. 1 is a block diagram showing bit decoding apparatus used in a communications system having modems engaged in modem to modem communications in accordance with one aspect of the invention.

FIG. 1 is a block diagram showing bit decoding apparatus used in a communications system having modems (100, 130) engaged in modem to modem communications in accordance with the one aspect of the invention. A sending modem 100, has, for example, a DPSK encoder 105, a transmitter filter and demodulator 110 and a digital to analog converter 115. The output of the sending modem is sent over communications channel 120 to the receiving modem 130.

The present invention does not rely on a timing tracker such as a phase locked loop for correct bit sampling, thereby avoiding the tracker's convergence related issues. Rather, it relies on M-times oversampling (in the duration of a bit signalling interval) of the received analog signal. A plurality of N-receivers (N<=M) or stream processors 155 running on the separate sampling phases within a bit time are allocated, as described more hereinafter, to the sampling phases. The lower bound of M (and N) is governed by the Nyquist sampling theorem. The higher bound of M (and N) is based on the processing power available.

The receiver structure described in this invention has a very important property of being scalable, i.e., the number of receivers may be easily configured based on the available resources, thus trading off reliability and processing bandwidth. A simpler receiver structure also leads to an overall simplification of the system design.

For DPSK, for example, the correlation demodulator (140) outputs M data samples during each bit signalling interval. In an ideal, distortion-less, and noise-free environment, every 0 bit produces M positive samples, and every 1 bit produces M negative samples. For an N channel implementation, each channel processes a stream of these samples spaced by one bit signalling interval. In general, within a bit signalling interval a channel can be assigned any one of the M samples. The stream of samples then represent a bit stream that can be correlated with any given data frame that needs to be received.

Figure 2:
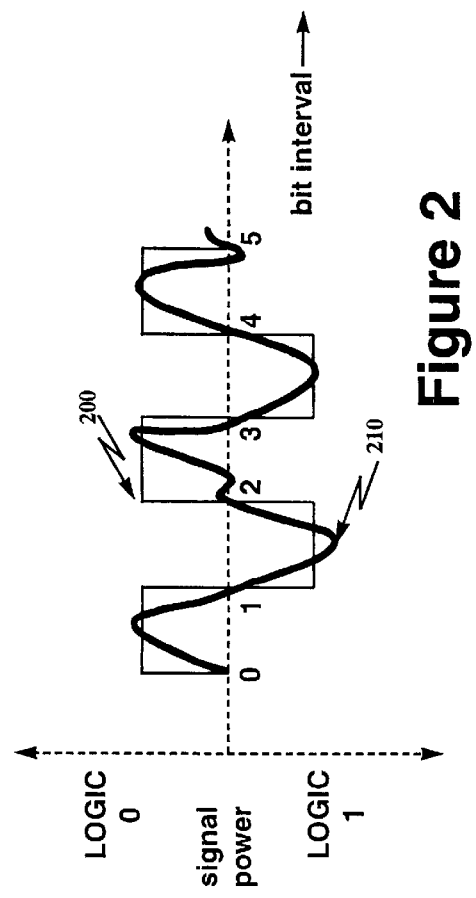
FIG. 2 is a signal diagram comparing signal output at the correlation demodulator shown in FIG. 1 under ideal and noisy conditions.

A DPSK signal transmitted by modem 100 may be demodulated and filtered by a bandlimiting filter, details of which are described in the V.34 specification. The complex demodulator does a complex multiply of the demodulated received signal from any given bit signalling interval with that of the previous bit signalling interval. The real part of these products may then be summed over the signalling interval, and these sums represent the binary decision variables information that may thresholded by a comparator and sampler circuit in order to decode a zero or a one bit. This is illustrated in FIG. 2. Two cases are depicted. The first is for an ideal distortion-less, noiseless channel, where the decision variables may be sampled from a square wave. The second case is for a noisy channel, in which case the sampling must be done on a distorted version of the ideal case square wave.

The data stream at the output of the correlation demodulator consists of M samples for every bit signalling interval. These samples are then fed to the demultiplexer 145 that partitions the input stream into M output streams. The samples of these M streams are then stored by shifting into a modulo M buffer 150, 345 at the bit rate. The shift register width is shown as sixteen, though other word widths may be selected depending on the memory size available. A single location in the buffer thus represents the equivalent of sixteen bits of information.

Figure 3A:
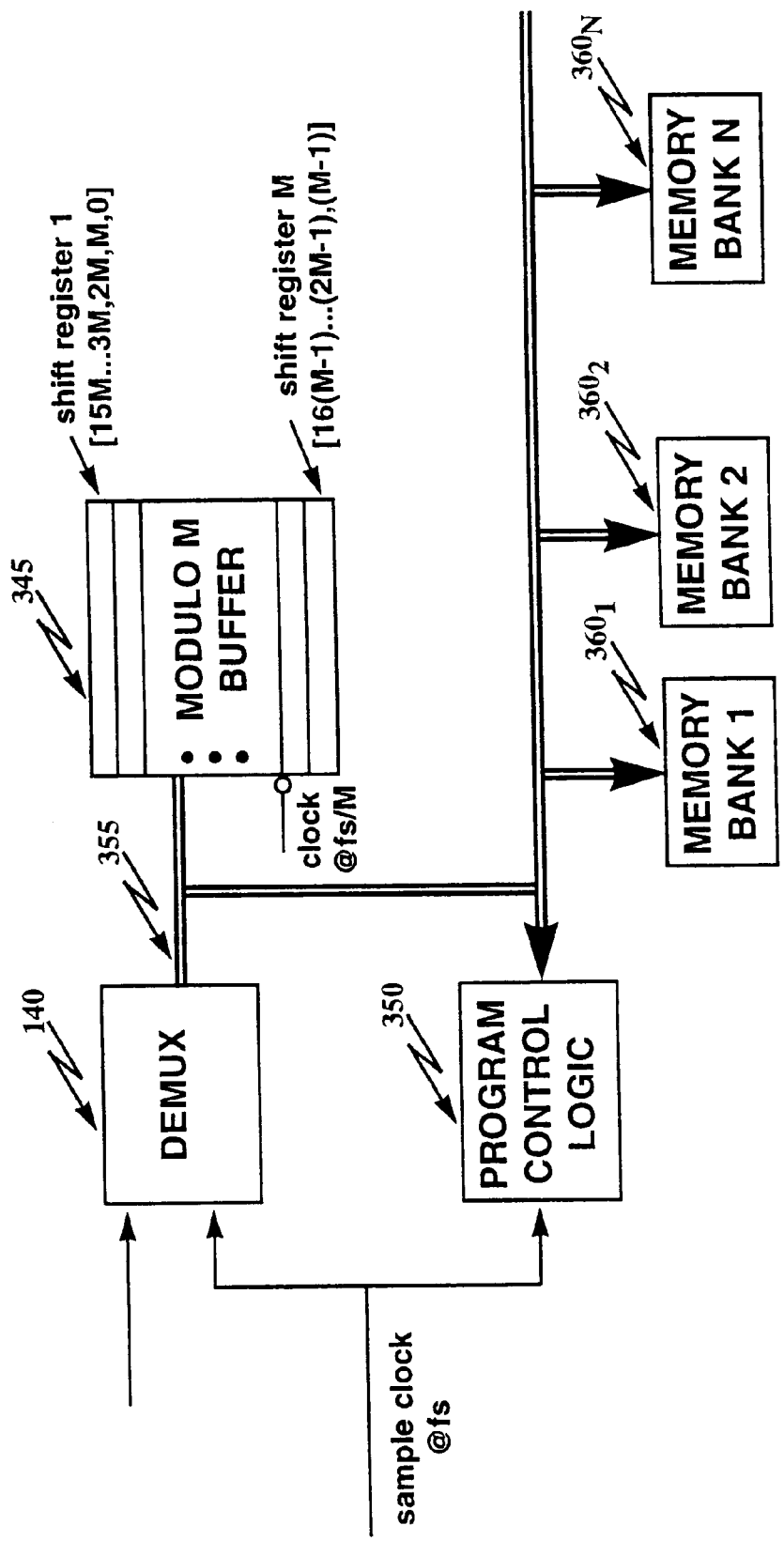
FIG. 3A is a block diagram of exemplary demultiplexer and stream processors shown in FIG. 1 used in carrying out another aspect of the invention.

FIG. 3A is a block diagram of the demultiplexer and stream processors shown in FIG. 1 used in carrying out an exemplary form of the invention. The demultiplexer 140 shown in FIG. 3A is the same demultiplexer shown in FIG. 1. The oversampled signal stream is applied to the input of the demultiplexer 140 and representations of the sample value are transferred over bus 355 to modulo M buffer 345. Modulo M buffer 345 comprises a set of shift registers each cell of which contains a sample value transferred over the bus 355. Preferably, each shift register processes a number of parallel bits simultaneously corresponding to the number of data bits processed by parallel by bus 355. The demultiplexer applies the M samples for each bit interval to a respective shift register in a rotating fashion so that sequential samples on bus 355 are loaded to individual shift registers until all M samples of a bit interval have been loaded and then the process begins again at a rotating fashion. Note that the values stored in each shift register in the modulo M buffer represent a value of the output signal from correlation demodulator 140. This representation can then be utilized to make a decision to whether the value represented by that sample is a binary 1 or 0. Typically this is done by establishing a decision threshold and the output has one logic state if the sample value is above or below the threshold value and a different state if it is below or above that value.

Program control logic 350 controls the bus and the operation of the individual receivers. Program control logic 350 can be a hardwired logic controller, a programmable controller or, preferably, a central processing unit. Memory banks 1–N ($360_1$–$360_N$) store information corresponding to each of N receivers implemented in accordance with the various aspects of the invention. Preferably, each of the memory banks stores information for a virtual receiver, which is implemented as discussed more hereinafter, and for the processes running on program controller logic 350.

Figure 3B:
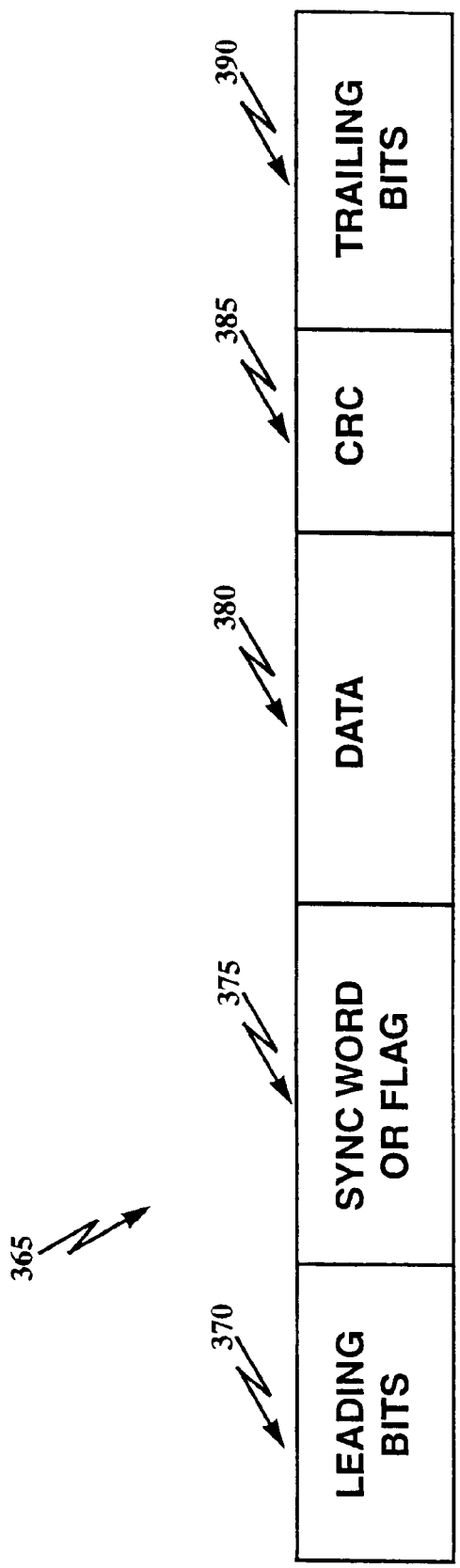
FIG. 3B is an illustration of an exemplary data frame or packet used to transfer signaling information in the exemplary embodiment shown in FIG. 1.

FIG. 3B is an illustration of a data frame or packet used to transfer signaling information in the exemplary embodiment shown in FIG. 1. Data frames of this format are found when using the 600 bit per second differential phase shift keying (DPSK) signaling during phase 2 of the V.34 training. Data frames of similar format are used during 300 bit per second V.21 modem exchanges during V.8 bis handshaking, and during use of low speed quadrature amplitude modulation (QAM) during phase 4 of the V.34 training among others.

The frame 365 begins with four leading bits 370, which are followed by a sync word or a flag 375. A number of data bits 380 are included followed by a cylic redundancy check 385 which is used to ensure that the information was received uncorrupted. Trailing bits 390 follow the CRC field. In an exemplary application, a total of 80 bits of data would be involved in sending the entire packet 365.

Figure 4:
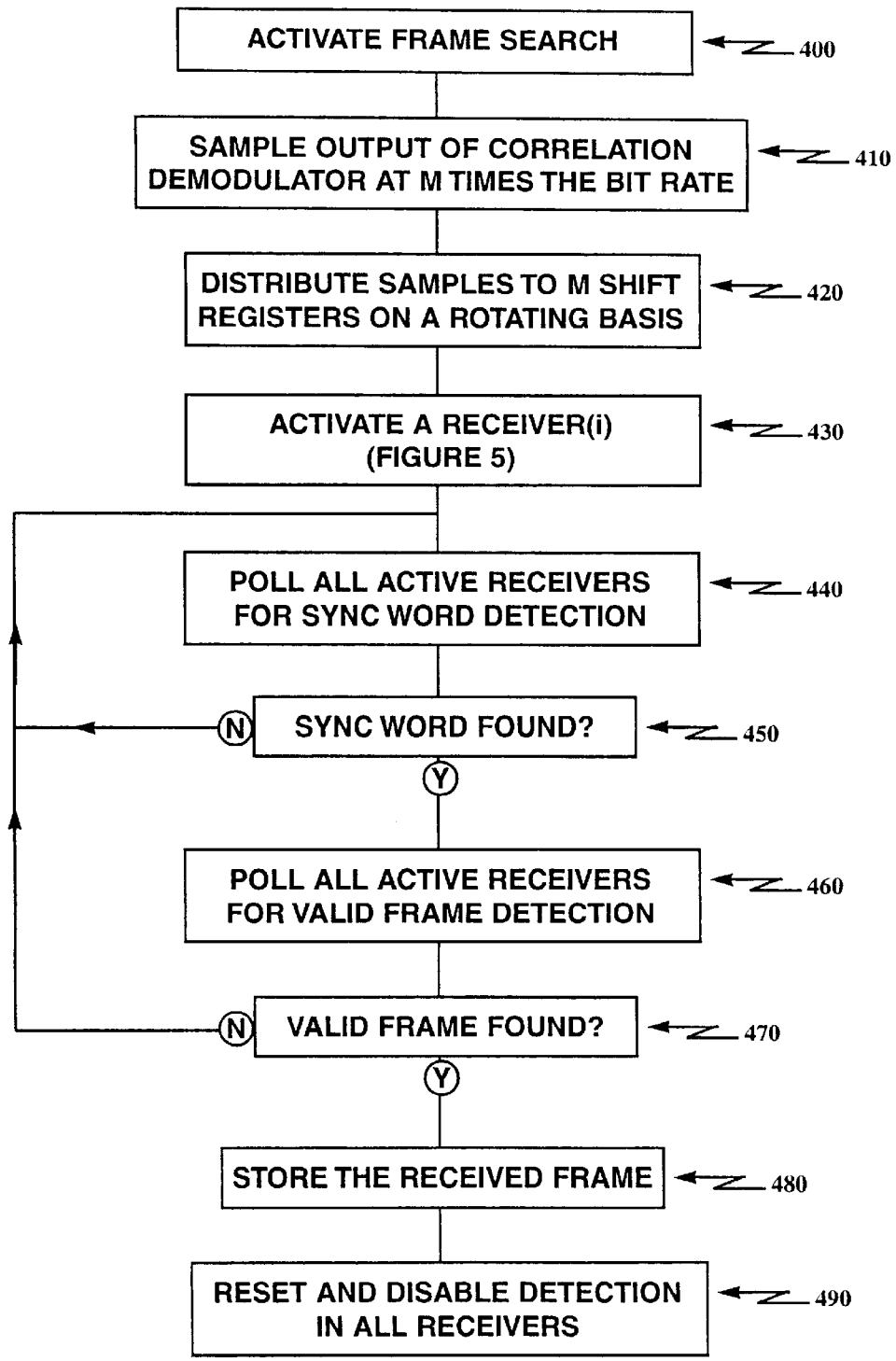
FIG. 4 is a flow chart of an exemplary process used by the program control logic of FIG. 1 to decode a packet of frame data in accordance with another aspect of the invention.

FIG. 4 is a flow chart of a process used by the program control logic of FIG. 3A to decode a packet of frame data in accordance with one aspect of the invention. When a frame search is activated (400), for example, by a higher level protocol, the oversampling of the output of the correlation demodulator begins (410) and the samples are distributed to the M shift registers shown in FIG. 3A (420). A receiver (I) is activated (430) as shown more in detail in FIG. 5. The program control logic 350 polls all active receivers to determine whether they have detected a sync word (440). If a sync word has been found by an active receiver (450-Y) all active receivers will be polled to determine whether or not they have detected a valid frame (460) such as by correct decoding of a CRC field. If a sync word is not found (450-N), the polling of active receivers continues (440). If a sync word is found, the receivers are polled to see if they have detected a valid frame. If a valid frame is not found (470-N), the polling of active receivers for sync word detection (440) continues. Otherwise (470-Y) a received frame is stored (480) and all active receivers are reset and disabled.

Figure 5:
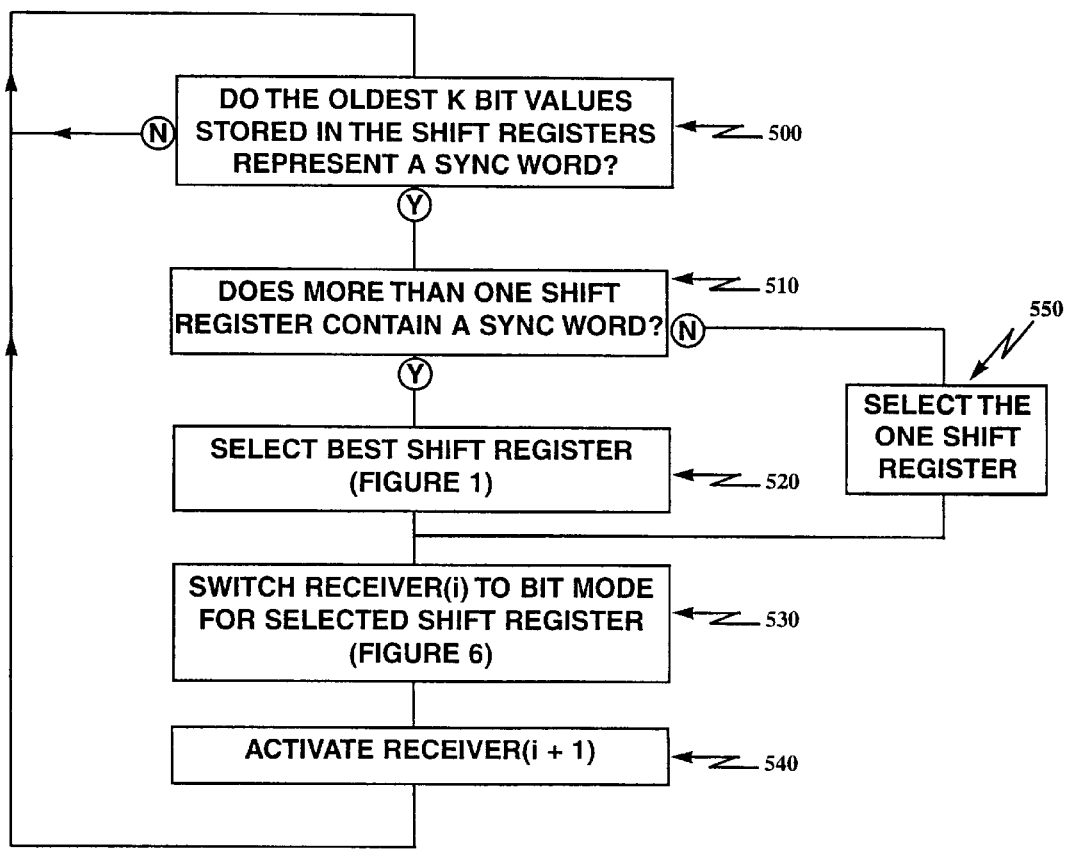
FIG. 5 is a flow chart of a process for activating and operating a receiver in accordance with yet another aspect of the invention.

FIG. 5 is a flow chart of a process for activating and operating a receiver in accordance with one aspect of the invention. Program control logic 350 marks a memory block ($360_I$) as active and begins a process of determining whether the oldest k bit values stored in each shift register represent a valid sync word (500). This can be done by doing a bit by bit comparison of the contents of a sync word stored in memory with the contents of respective shift registers to determine if there is a match. If there is (500-Y), then one checks to determine whether more than one shift register contains a valid sync word (510). If they do, the shift register containing the best data is selected as described more in conjunction with FIG. 7 (520). If only one sync word is detected (510-N), the shift register containing it is selected (550). Once the sync word has been determined to have been detected by the receiver (I) (530) the receiver (I) will switch to bit mode (as shown in more detail in FIG. 6) for the selected shift register identified as the best in conjunction with step 520. Basically, the shift in mode is from sample mode, where the receiver considers all samples stored in all shift registers, to bit mode, where the receiver concentrates only on the bit values found in a single shift register. Substantially contemporaneously with the switching of the receiver I to bit mode, a new receiver (I+1) is activated and begins the process shown at step 500. Meanwhile, receiver I is still functioning but utilizing the bit mode shown in FIG. 6.

Figure 6:
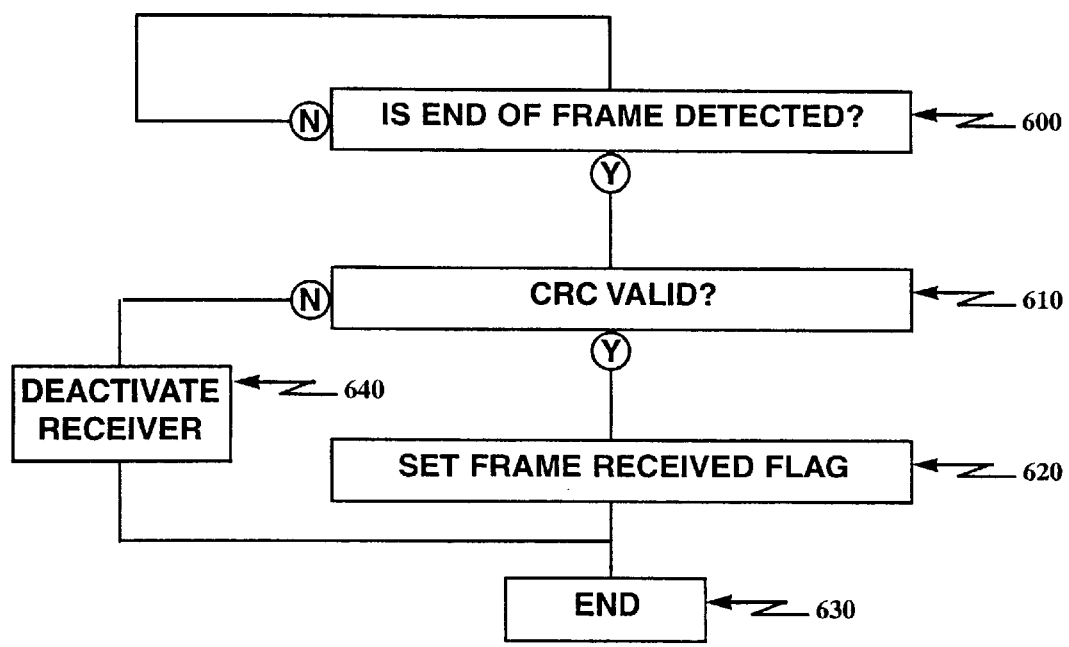
FIG. 6 is a flow chart of a process for detecting receipt of a valid frame in accordance with another aspect of the invention.

FIG. 6 is a flow chart of a process for detecting receipt of a valid frame in accordance with an aspect of the invention. Once the receiver is in bit mode, it checks to determine whether an end of frame has been detected (600). Once an end of frame is detected (600-Y) a check is made to determine whether the CRC field is valid for the data received. If it is (610-Y), the frame received flag will be set (620) and that way, when the program control logic checks the memory block associated with the receiver, it will see a receive frame flag set and store the received frame as discussed in conjunction with FIG. 4 at item 480. If the CRC is not valid (610-N), the receiver is deactivated (640) and the process ends. Once the valid frame has been received, the receivers activated for searching for the correct sync word or flag are reset and disabled pending activation when needed to receive the next frame.

Figure 7:
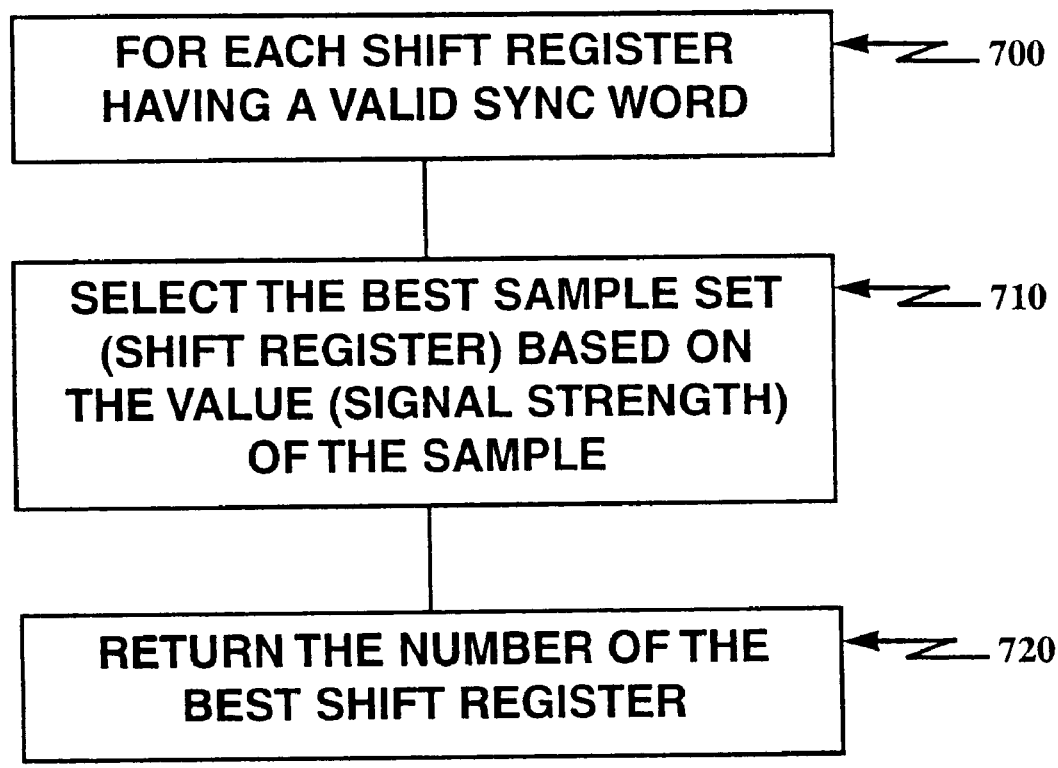
FIG. 7 is a flow chart of a process for selecting one of plural sync words in accordance with an aspect of the invention.

FIG. 7 is a flow chart of a process for selecting one of plural sync words in accordance with one aspect of the invention.

When a particular receiver detects a sync word on more than one phase (i.e., in more than one shift register of the modulo M buffer), it selects the best sample set based on the value of the samples (710). One should note that when receiving low noise signals, one would expect that the wave shape would more approximate the square wave shown in FIG. 2 than the alternative signal shape shown there. As a result, each phase would tend to properly establish the signal value for the bit. For example, considering FIG. 2, if a slightly positive decision threshold were used, and if the squarewave shown between 0 and 1 in FIG. 2 were sampled in each of the instances indicated by the dots along the axis, each of those samples would have a value that would be above the decision threshold and would be construed as logic 0. However, the value of samples from the noisy output (more rounded output) shown in FIG. 2, when sampled at those same instances, would have sample values which would be below the decision threshold and which would therefore be interpreted as logic 1, rather than logic 0. As a result, the optimal phase or oversampling subinterval of the bit interval to be used for decoding a particular signal can be determined by the amplitude value of the sample signal stored for that particular phase in the modulo M buffer.

A number of processing techniques or algorithms can be utilized to identify the best sample set based on the value (signal strength) of the sample. One could, for each shift register having a valid sync word, select as an output bit, the bit of the shift register having the highest amplitude value among those shift registers having a valid sync word. During the next bit interval, the same comparison could be made and a different output bit might be selected. In this manner, one might change, from bit to bit, the shift register from which the output bit was taken. In another approach, one could average the sample value for each of the bits contained within a particular shift register of the modulo M buffer having a valid sync word to determine which of the shift registers contained the best set of samples on the average over the bits contained therein.

In practice, this degree of sophistication is not required. The best mode contemplated by the inventor for making this selection is to utilize the value for the last bit in the sync word in each of the registers having a valid sync word to determine the best. That is, one would consider the value of the last sample in each shift register for the last bit of the sync word detected in that shift register to determine which shift register contained the maximum value. That shift register would then be selected for use in determining the bit value of the signal received in each of the intervals. This value is returned (720) to the process shown in FIG. 5 at step 520 for use in setting the receiver I to the correct shift register for bit mode processing.

The program and control logic manages the various stream receivers and is scheduled at the sample rate. At startup the program and control logic resets the memory banks of all the receivers, and puts the detectors in a disabled state. If a request to decode a frame of data is received, then the controller enables one receiver and puts it in sample mode. The enabled receiver acknowledges by raising an activation status flag.

If the controller detects that the receiver has detected a sync word, it then enables the next receiver that is in a deactivation state by putting it in sample mode. This process may continue until all available receivers are activated. If the controller detects that one of the receivers has detected an entire valid frame of data, it then stores the received frame.

Although the various aspects of the invention have been described in conjunction with modem communications, the invention disclosed has application to almost any field in which detection of a sync word is desired. This would include, inter alia, carrier sense multiple access/collision detection (CSMA/CD), data communications, data multiplexing, and data communications generally in other environments.

Although the present invention has been described and illustrated in detail, it is clearly understood that the same is by way of illustration and example only and is not to be taken by way of limitation, the spirit and scope of the present invention being limited only by the terms of the appended claims.

I claim:

1. Apparatus for detecting a synchronization word having a number of bits, comprising:
   a. a signal sampler sampling an incoming signal at M times an expected bit rate, where M is an integer;
   b. M registers, each storing N occurrences of a respective one of M samples, where N is at least equal to a number of bits contained in the synchronization word;
   c. a distributor for distributing samples from the signal sampler to the M registers; and
   d. a first receiver, monitoring the contents of all the M registers, to determine whether they contain a bit pattern which corresponds to said synchronization word.

2. Apparatus of claim 1 further comprising:
   a selector for selecting one of said M registers which contains a better representation of said synchronization word than the others.

3. Apparatus of claim 2 in which the criteria for selection includes which contains the largest amplitude bit samples.

4. Apparatus of claim 3 in which the largest amplitude bit samples are determined by comparing the average amplitude of all bits contained within respective registers.

5. Apparatus of claim 3 in which the largest amplitude bit samples are determined by comparing the amplitude value of the last bit stored in said registers.

6. Apparatus of claim 3 in which the largest amplitude bit samples are determined by comparing running averages of the amplitude of samples passing through each register.

7. Apparatus of claim 2 further comprising a signal output selector for assigning the output of at least one selected register to a respective data output.

8. Apparatus of claim 7 further comprising a plurality of receivers, activated one at a time each time a signal output selector assigns a selected register to a respective data output.

9. Apparatus of claim 8 in which the signal output selector assigns a different register each time it assigns a register to a respective one of plural data output.

10. Apparatus of claim 2 in which data from each data output is stored in a respective output buffer and the contents of each respective data output buffer are checked for the presence of a valid CRC.

11. Apparatus of claim 10 in which, when a valid CRC is found, the data stored in the data output buffer having a valid CRC is directed to a device output.

12. Apparatus of claim 11 in which, when a valid CRC is found and the data stored in the data output buffer having a valid CRC has been directed to a device output, all active receivers are reset and deactivated.

13. Apparatus of claim 1 in which said synchronization word is contained in a data frame.

14. Apparatus of claim 13 in which said data frame is a data frame specified by a V.34 standard.

15. Apparatus of claim 1 in which said incoming signal is taken from the output of a DPSK or QAM detector.

16. A method of detecting a synchronization word having a number of bits, comprising the steps of:
   a. sampling an incoming signal at M times an expected bit rate, where M is an integer;
   b. storing N occurrences of a respective one of M samples in a respective storage unit; and
   c. monitoring the contents of all storage units to determine whether they contain a bit pattern which corresponds to said synchronization word.

17. A system for detecting a synchronization word, comprising:
   a. a first communications apparatus;
   b. a second communications apparatus;
   c. a communications link connecting said first communications apparatus and said second communications apparatus; and
   d. at least one of said first communications apparatus and said second communications apparatus comprises a signal sampler sampling an incoming signal at M times an expected bit rate, where M is an integer; M registers, each storing N occurrences of a respective one of M samples, where N is at least equal to a number of bits contained in the synchronization word; a distributor for distributing samples from the signal sampler to the M registers; and a first receiver, monitoring the contents of all the M registers, to determine whether they contain a bit pattern which corresponds to said synchronization word.

18. The system of claim 17, in which said communications link includes a network.

19. A method of communicating between a first communications device and a second communications device over a communications link, comprising the steps of:
   a. receiving an incoming signal containing a synchronization word from said communications link;
   b. sampling said incoming signal at M times an expected bit rate, where M is an integer;
   c. storing N occurrences of a respective one of M samples in a respective storage unit;
   d. monitoring the contents of all storage units to determine whether they contain a bit pattern which corresponds to said synchronization word; and
   e. providing a data output from a selected storage unit which contains a better representation of a synchronization word than contained in other storage units when data in said selected storage unit is determined to be valid.

20. A computer program product, comprising:
   a. a memory medium; and
   b. a computer program stored on said memory medium, said computer program comprising instructions for sampling an incoming signal at M times an expected bit rate, where M is an integer, storing N occurrences of a respective one of M samples in a respective storage unit, and monitoring the contents of all storage units to determine whether they contain a bit pattern which corresponds to said synchronization word.

21. A computer program product, comprising:
   a. a memory medium; and
   b. a computer program stored on said memory medium, said computer program comprising instructions for causing sampling of an incoming signal at M times an expected bit rate, storing N occurrences of a respective one of M samples in a respective storage unit, monitoring the contents of all storage units to determine whether they contain a bit pattern which corresponds to said synchronization word, and providing a data output from a selected storage unit which contains a better representation of a synchronization word than contained in other storage units when data in said selected storage unit is determined to be valid.

* * * * *